INVENTORS
BORIS F. GRIB
JOHN J. McMEEKIN
BY Darby & Darby
ATTORNEYS

Dec. 26, 1961    B. F. GRIB ET AL    3,014,774
ELECTRICAL EQUIPMENT HOUSING
Filed July 11, 1957    5 Sheets-Sheet 2
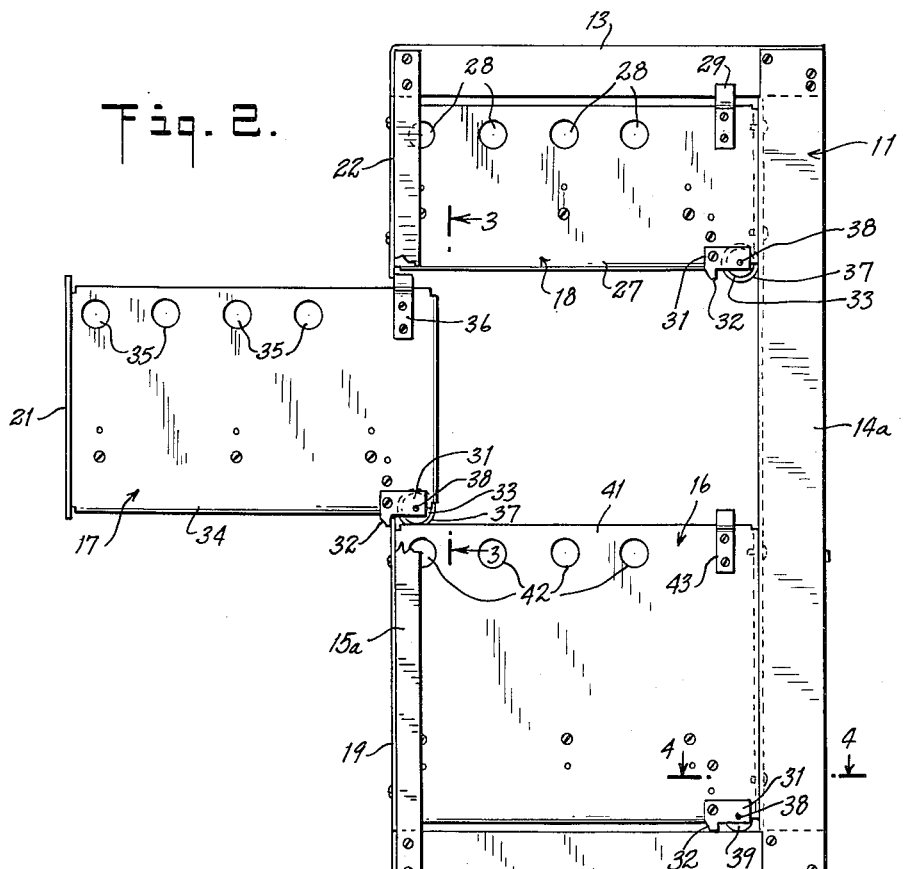
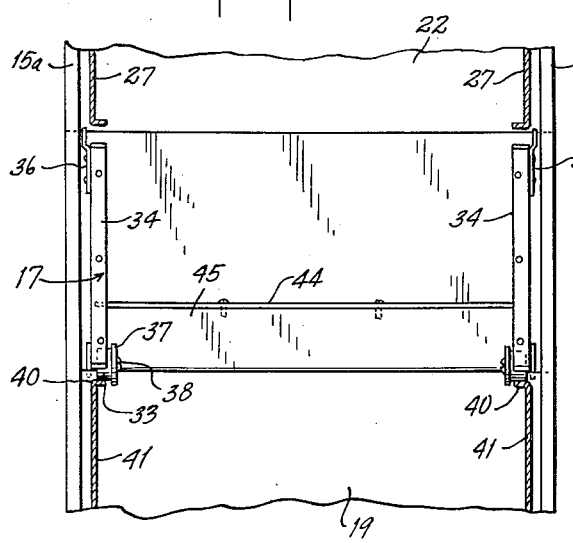
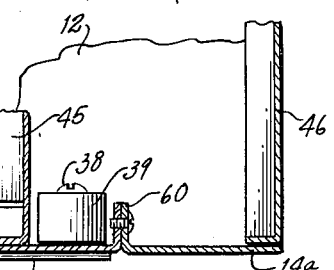
INVENTORS
BORIS F. GRIB
JOHN J. McMEEKIN
BY Darby & Darby
ATTORNEYS

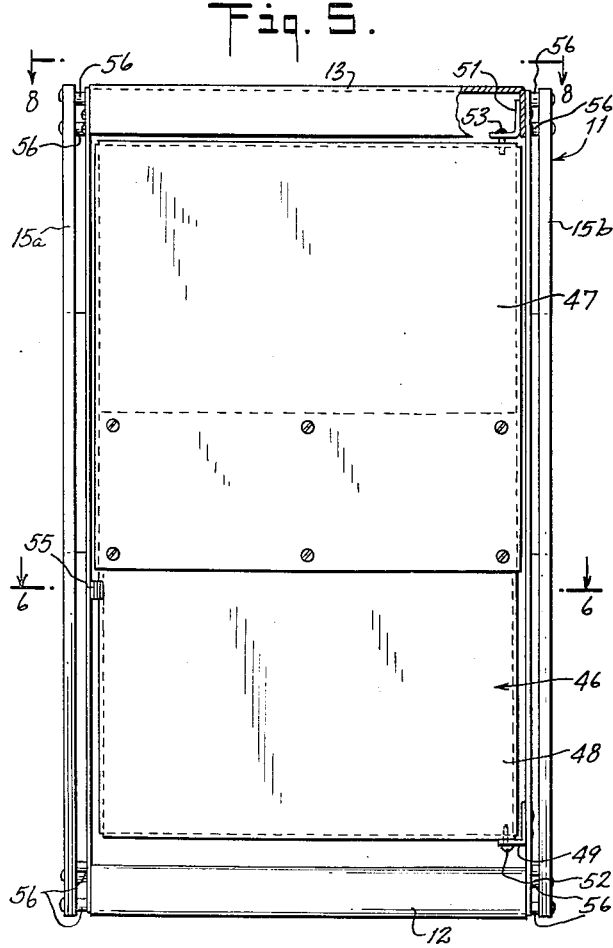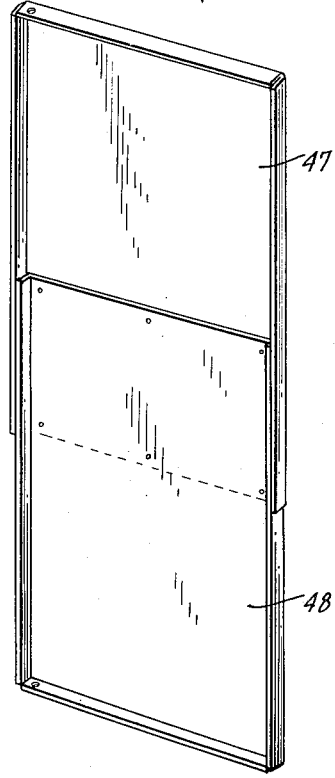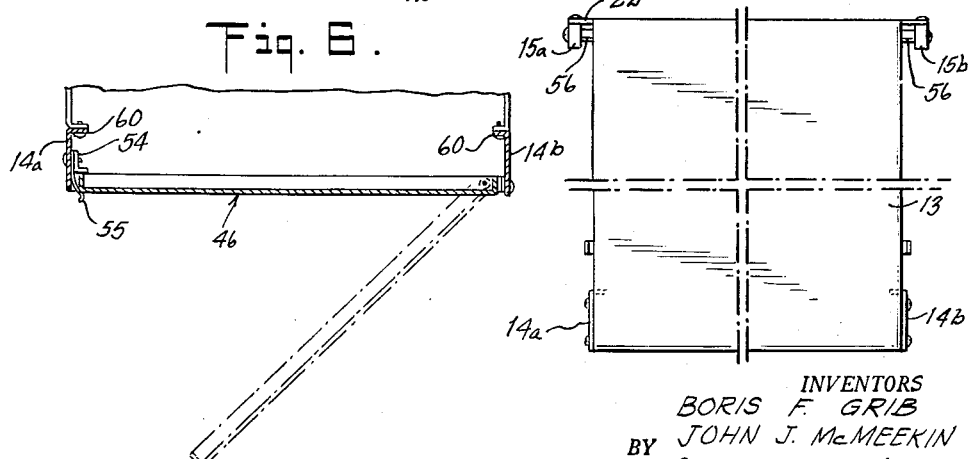

Dec. 26, 1961   B. F. GRIB ET AL   3,014,774
ELECTRICAL EQUIPMENT HOUSING
Filed July 11, 1957   5 Sheets-Sheet 4
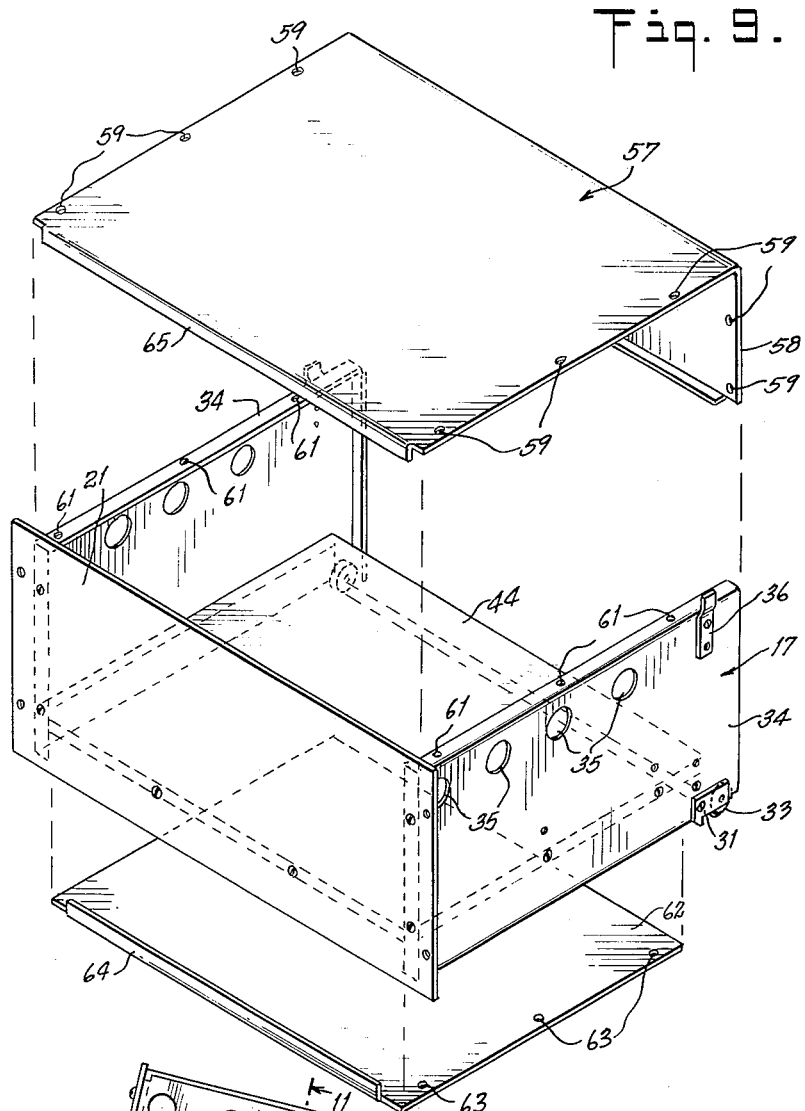
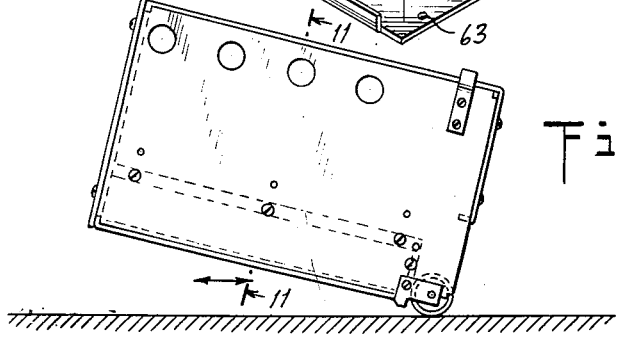
INVENTORS
BORIS F. GRIB
JOHN J. McMEEKIN
BY Darby & Darby
ATTORNEYS Dec. 26, 1961 B. F. GRIB ET AL 3,014,774
ELECTRICAL EQUIPMENT HOUSING
Filed July 11, 1957 5 Sheets-Sheet 5

INVENTORS
BORIS F. GRIB
JOHN J. McMEEKIN
BY Darby & Darby
ATTORNEYS

United States Patent Office 3,014,774
Patented Dec. 26, 1961

3,014,774
ELECTRICAL EQUIPMENT HOUSING
Boris F. Grib, Huntington Station, and John J. Mc-
Meekin, New Hyde Park, N.Y., assignors to Philamon
Laboratories, Inc., Westbury, N.Y., a corporation of
New York
Filed July 11, 1957, Ser. No. 671,272
4 Claims. (Cl. 312—341)

The present invention relates to the housing of electrical equipment in chassis assemblies, and more particularly to such a housing system which can be assembled in a great variety of sizes and configurations from a small number of standard parts of predetermined size and shape.

The customary method of mounting electrical equipment involves the use of a structure commonly referred to as a chassis or chassis assembly. Electrical components are mounted on and under the chassis and where a number of such chassis are used they are customarily mounted one above the other in a structure commonly called a relay rack. Relay racks are of course utilized for mounting all types of electrical equipment and not simply for mounting relays.

The customary relay rack housing constitutes one or more chassis assemblies in a sheet metal cabinet. The chassis are normally of open construction to promote ventilation but must usually be strengthened by braces or otherwise to support the electrical components which are often quite heavy. The cabinet in which the chassis are retained being of sheet metal is also quite heavy.

In order to facilitate maintenance of the equipment the cabinets are often provided with runners so that the chassis assemblies may be withdrawn in drawer-like fashion. Brackets are also frequently provided to support the chassis assemblies in a position partially withdrawn from the cabinet so that repairs or replacements can be made in the chassis assembly without completely separating the chassis assembly and severing the electrical connections. The runners and brackets add still further to the weight and expense of the customary relay rack housing.

The relay rack type housing is generally customarily made to accommodate the particular equipment for which it is designed. The production cost of small lots is therefore very high.

The present invention is intended, among other things, to eliminate the necessity for a separate cabinet enclosure in an electrical equipment housing by constructing chassis assemblies which perform the function of enclosing the equipment. A great saving of weight is thereby accomplished and the expense of the installation is reduced. Other features of the present invention are calculated to overcome disadvantages of previous electrical equipment cabinets without increasing the expense, in fact allowing a saving in cost while providing a more practical and efficient housing.

A further advantage accrues from the fact that the present housing is designed so that it may be assembled from a relatively small number of standard components. From these components a large variety of housings of different sizes or having chassis assemblies of different sizes may be constructed. The construction of the housings from the standard components does not require the use of heavy metal-working machinery. An assembler of electrical equipment may therefore produce specially designed housings for the equipment without investing in expensive machinery by utilizing these standard components.

The use of a small number of standard components also makes it possible to construct specially designed housings in small numbers without incurring prohibitive design and tooling expense. The present electrical equipment housing arrangement therefore provides the advantages of custom designed housings without the high tooling and design cost normally to be expected, and at the same time, due to the elimination of a separate outside cabinet for the housing, a more efficient housing may be produced at a lesser cost.

It is accordingly an object of the present invention to provide an electrical equipment housing wherein the side plates of the chassis assemblies are designed to form the sides of a cabinet thus eliminating the necessity for an external cabinet for the equipment housing and reducing the weight and eliminating the waste of space occasioned by the use of a separate external cabinet for the electrical equipment housing.

It is another object of the present invention to provide an electrical equipment housing wherein a number of chassis are assembled to form a rigid and sturdy structural assembly which may be shipped without danger of damage and which is resistant to shock and vibration.

It is still another object of the invention to provide an electrical equipment housing which may be constructed to be of a desired size simply by cutting four vertical column members and adjusting the telescoping rear door of the cabinet.

It is a further object of the present invention to provide a chassis wherein the front panel of the chassis becomes the front panel of the equipment cabinet thus eliminating duplication of panels and the necessity for cutting duplicate holes in two plates to provide clearance for meters, switches, knob-shafts and the like.

It is a still further object of the present invention to provide chassis assemblies for electronic equipment housing cabinets wherein each chassis assembly is provided with rollers which roll on a portion of an underlying chassis thus enabling each chassis to be easily withdrawn in drawer-like fashion from the housing.

It is a still further object of the present invention to provide a chassis assembly of the foregoing type wherein lugs are provided to retain the chassis in an extended or withdrawn position to facilitate maintenance of the equipment mounted on the chassis.

Other objects and advantages will be apparent from a consideration of the following description in conjunction with the appended drawings, in which, FIG. 1 is an isometric front, side and top view of a complete electrical equipment cabinet according to the present invention;

FIG. 2 is a side elevational view of the cabinet of FIG. 1;

FIG. 3 is a fragmentary sectional front elevation view of the cabinet of FIG. 2 taken along the line 3—3 in FIG. 2;

FIG. 4 is a fragmentary horizontal sectional view of a portion of the cabinet of FIG. 2 taken along the line 4—4 in FIG. 2;

FIG. 5 is a rear elevational view of the cabinet of FIG. 1;

FIG. 6 is a horizontal sectional view of the door of the cabinet of FIG. 5 taken along the line 6—6 in FIG. 5;

FIG. 7 is an isometric view of the door of the cabinet of FIG. 1;

FIG. 8 is a fragmentary top plan view of the cabinet of FIG. 1 showing the four corners of the cabinet;

FIG. 9 is an isometric exploded view of one chassis assembly of the cabinet of FIG. 1;

FIG. 10 is a side elevational view of the chassis assembly of FIG. 10;

Figure 1:
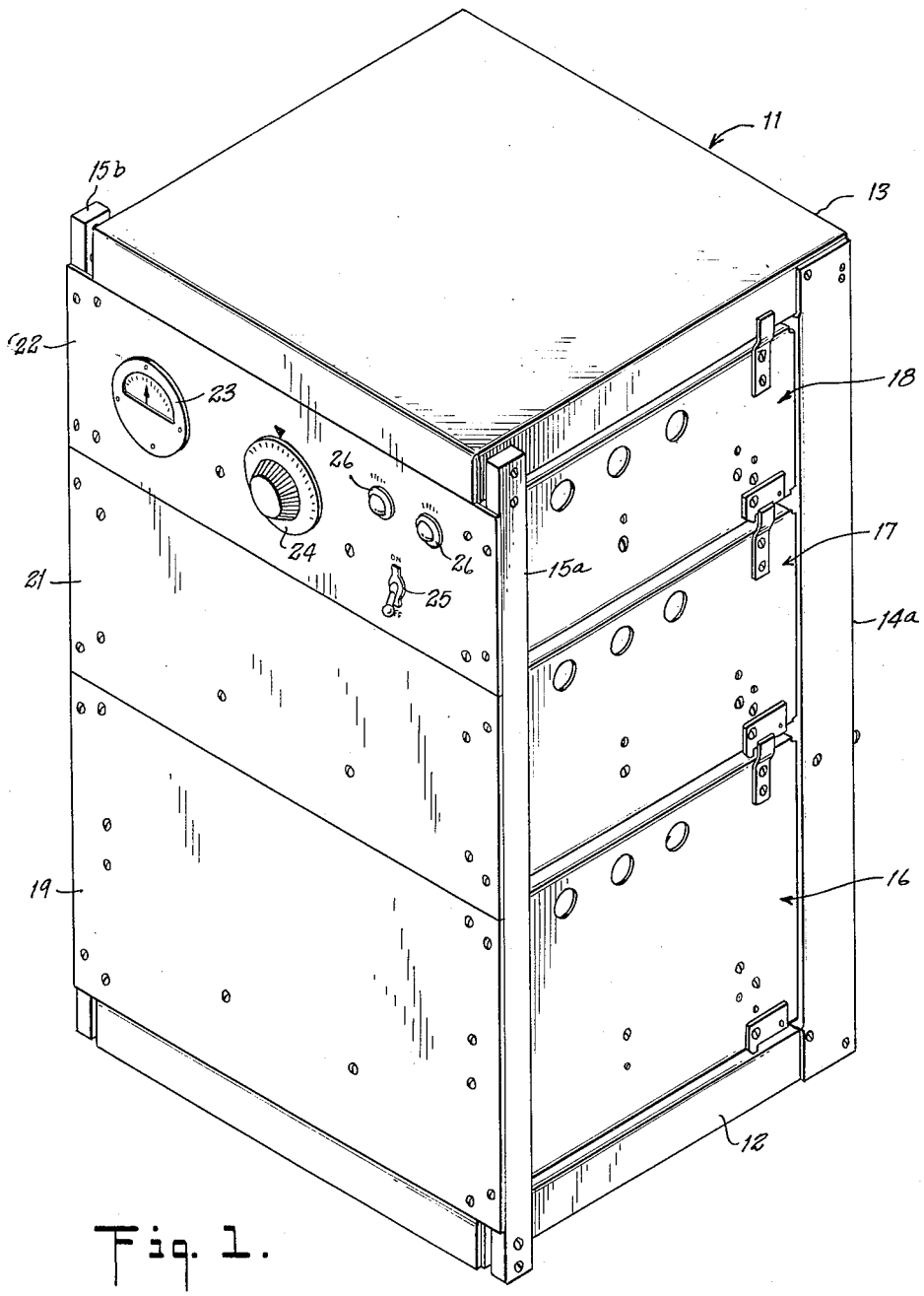

Referring now to FIG. 1 an electrical equipment housing 11 is shown having a bottom plate or base 12 and a top plate or cover 13. The cover 13 is supported by the rear column members 14a and 14b (14b is not shown in FIG. 1) and by front column members 15a and 15b.

The housing 11 as illustrated here contains three chassis assemblies 16, 17 and 18. For purposes of illustration the cabinet 11 is shown having three chassis of different size. However, it should be understood that a greater or lesser number of chassis could be utilized in which case the column members 14 and 15 could be made longer or shorter as will later be explained, and also the chassis assemblies in the cabinet may be all of the same size or of any combination of sizes, as desired.

The chassis assemblies 16, 17 and 18 are provided with front panels 19, 21 and 22 respectively which, taken together, form the front panel of the electrical equipment housing 11. The front panels 19, 21 and 22 may have mounted therein various meters, knobs, switches or indicator lights as illustrated at 23, 24, 25 and 26 respectively. It will be understood that the variety and arrangement of devices on the panel 22 shown in FIG. 1 is illustrative only and that any arrangement of meters and switches or the like could be provided in any or all of the panels 19, 21 and 22.

A more detailed side view of the housing 11 is shown in FIG. 2.

The chassis 17 is shown in its withdrawn or extended position in FIG. 2 and the front column member 15a is broken away to better show the construction of the middle chassis assembly 17.

The top chassis assembly 18 is provided with side panels 27. Panels 27 may be provided with ventilating holes as shown at 28. A lug 29 is provided extending from the top of the side panel 27 which serves to prevent the chassis assembly 18 from being accidentally withdrawn entirely from the housing cabinet and also serves to support the chassis assembly in its open or extended position as will be explained hereinbelow. A plate 31 having a lug 32 is attached to each side panel 27 and also serves to retain the chassis assembly in the extended position.

A wheel or roller 33 is rotatably mounted at the rear of each side panel 27. The roller 33 rolls along the top of the underlying chassis assembly when the chassis assembly 18 is withdrawn or inserted into the housing cabinet.

The roller 33 thus facilitates the assembly or replacement of the chassis assemblies in the housing, often making it possible for one man to handle the chassis assembly where two would be required before. The importance of the rollers can be fully realized when it is understood that the chassis assemblies will often weigh 50 pounds or more thus making them very difficult to handle.

The roller 33 may be provided with a flange 37 and may be pivotally mounted by means of a threaded screw or pin 38. The flange 37 on the roller 33 will cause the side panel of the underlying chassis assembly to act as a guide rail and thus maintain the alignment of the chassis assembly 18 as it is inserted in the electrical equipment housing. The lug 29 may also serve to guide or retain the chassis assembly 18, but it will be obvious that in some cases one chassis assembly must be placed in the housing at a time when no chassis or other member is in place above it and thus the lug 29 is not alone sufficient to guide the chassis assemblies in the course of their insertion in the housing.

The middle chassis assembly 17 may also be provided with ventilation holes 35 and a stop lug 36. A roller 33 is provided for the chassis assembly 17 similar to that previously described with relation to the top chassis assembly 18.

The manner in which the top lug 36 and the bottom lug 32 of a chassis assembly allow the chassis assembly to be supported in an extended position is illustrated in FIG. 2. It will be noted that the middle chassis assembly 17 has been withdrawn until the bottom lug 32 has ridden over the edge of the front panel 19 of the bottom chassis assembly 16. The lug 32 may be lifted over the edge of the front panel 19 by raising the front panel of the chassis 17 thereby pivoting it about its roller 33. The rear edge of the lug 32 is vertical so that the lug will not pass backward over the edge of the panel 19 without being lifted as previously explained. Therefore, once the lug 32 has been pulled forward of the panel 19 it will thereafter prevent the bottom of the chassis assembly 17 from rolling backward to allow the front end of the chassis assembly to drop.

At the same time the top of the chassis assembly 17 is prevented from falling forward due to the fact that the lug 36 strikes the bottom edge of the front panel 22 of the top chassis assembly 18. Since chassis assembly 18 is secured in place, the chassis assembly 17 is therefore supported in cantilever fashion so that access may be had to virtually all parts of the chassis assembly for maintenance, repair or replacement of parts.

As previously explained the chassis assembly may be rolled back into the housing assembly by lifting the front end of the chassis assembly to lift the lug 32 over the top edge of the front panel 19 of the lower chassis assembly 16. If it is desired to remove the chassis assembly entirely, the front of the chassis assembly 17 is lifted still further until the rear end of the chassis assembly clears the front panel 19, at which time the chassis assembly may be lowered to disengage the lug 36 from the overlying chassis assembly 18. The chassis assembly 17 may be placed into the housing by reversing the steps of the operation. The operation of the other chassis assemblies 18 and 16 is substantially the same as that described for chassis assembly 17.

The lower chassis assembly 16 is also provided with side panels 41 which may have ventilation holes 42. The side panel 41 is provided with a stop lug 43 and also with a lower plate 31 having an extending lug 37. The lugs 43 and 32 are similar to corresponding portions of previously described chassis assemblies.

A roller 39 may be provided for the bottom chassis assembly 16 which may be somewhat different than the previously described rollers 33 in that it need not be provided with a flange. The roller 39 is preferably not provided with a flange since the chassis assembly 16 does not rest on another chassis assembly but rather on the flat base 12 of the housing 11. Such a roller arrangement is shown in detail in FIG. 4. It is of course obvious that the roller 39 could be provided with a flange and a channel could be provided in the base 12 or alternatively the dimensions of the housing could be adjusted to allow for presence of the flange on the bottom rollers.

FIG. 3 shows the manner in which the flanged rollers of the chassis assembly panels 41 rest on the underlying chassis assembly. It may be desired to make the side panels 41 more rigid by providing a flange 40 at the top of each side panel 41. This will also provide a more rigid and satisfactory rail or guide for the rollers 33.

FIG. 5 shows the rear of the housing which may be enclosed by a door 46. From the previous description of the electrical equipment housing it will be obvious that different sizes and different numbers of assemblies may be put together to form a complete housing. The housing may be made of a different overall height simply by cutting off the four column members 14a, 14b, 15a and 15b to the desired height and securing the cover 13 to the top of the column members. The fastening may be accomplished by the use of screws or bolts placed in the column members. Holes to accommodate the screws or bolts may be pre-drilled or punched at the time of manufacture or may be made by the assembler. The door 46 for the housing should also be constructed so that it is readily adjustable in size and thus may be adjusted to conform to the particular size of housing it is desired to assemble.

The door 46 in FIG. 5 is accordingly made readily adjustable in height by constructing it of two telescoping sections 47 and 48. The door sections 47 and 48 may thus be made to overlap by varying amounts providing a range of door heights of almost 2 to 1. The door sections 47 and 48 may be fastened together in any suitable manner as by the use of screws, bolts, rivets or the like.

A hinge bracket 49 is attached to the lower portion of the rear column 14a of the housing. A hinge pin 52 is fastened to the bracket 49 and engages a hole in the door section 48. A similar bracket 51 is attached to the top cover 13 of the housing and a pin 53 is secured in the bracket 51 to complete the pivotal mounting of the door 46. The door 46 may of course be hinged in any other suitable manner but it is preferred that the door 46 be hinged in such a manner that it will not interfere with the adjustment of the height of the door. A spring catch may be provided for the door consisting of a stop bracket 54 and a retainer spring 55 as shown in FIG. 6.

From the previous explanation of the manner in which the individual chassis assemblies are removed from the housing 11 it will be obvious that a clearance must be provided between the front columns 15a and 15b and the sides of the chassis assembly 16, 17 and 18 to allow for the passage of the lugs 32 and the lugs 29, 36 and 43.

As shown in FIG. 5, spacers 56 are provided between the cover 13 and the front columns 15a and 15b and also between the base 12 and these front columns. The spacers 56 allow room for the passage of the lugs such as 36 as may best be seen in FIGS. 3 and 8.

A further advantage of the chassis assemblies 16, 17 and 18 resides in the fact that each individual chassis may be converted into a completely self-sufficient individual housing simply by the addition of top and bottom covers to the chassis assembly. This and other details of the chassis assembly contruction is shown in FIG. 9.

An L-shaped cover 57 is provided for the chassis assembly 17. A downwardly extending portion 58 of the cover 57 covers a part of the back of the chassis assembly. It is preferred that the chassis assembly not be completely enclosed to permit ventilation, and thus the back portion 58 of the cover 57 does not extend the full height of the back of the chassis assembly 17. For the same reason the base 44 of the chassis assembly 17 does not extend all the way to the rear of the chassis and thus the circulation of air will be promoted through the opening at the rear of the chassis over the components mounted in the chassis and out the ventilation holes 35 in the sides of the chassis. In this fashion a chimney-like cooling effect is produced which provides a vigorous self-induced flow of cooling air over heat producing electrical equipment.

Holes 59 may be provided in the cover 57 to coincide with holes 61 in the sides 34 of the chassis assembly. It will generally be preferred that the holes 61 be tapped so that the cover may be fastened on simply by the placing of screws through the holes 59 into the tapped holes 61. Of course many other suitable means for fastening the cover 57 on the chassis assembly 17 could be used.

A bottom cover 62 may be provided to render the chassis assembly 17 a complete individual electrical equipment housing. Holes 63 may be provided in the bottom cover 62 for fastening it to the chassis assembly 17 and it may also be desired to provide a flange 64 on the bottom cover 62 to increase its strength and rigidity and to increase the overall ruggedness of the chassis assembly. A similar flange 65 may be provided on the top cover 57.

A further advantage accrues by reason of the rollers 33 on the rear of the chassis assemblies in that while working with the chassis assemblies on a workbench, they may be moved from place to place by rolling in wheelbarrow fashion as illustrated in FIG. 10. The rollers 33 thus not only facilitate sliding of the chassis assemblies in the housing, but also facilitate moving of the chassis assemblies in the course of assembly or repair.

Work on the electrical equipment mounted on the chassis assemblies is also facilitated by the fact that the assembly sides extend beyond the equipment on all sides so that the electrical equipment does not anywhere protrude from the chassis and thus the chassis may be placed on any of its six sides for repair, assembly, or inspection.

It is contemplated that the present electrical housing arrangement will enable companies engaged in the assembly of electronic equipment to procure a minimum of different component parts for the construction of chassis assemblies and housing units according to the present invention. The assemblers will then punch or otherwise form holes in the chassis bases and panels as required for the particular equipment which they desire to assemble. The chassis assemblies are designed to allow the punching of such holes on punch presses thus allowing rapid and efficient production. The sections of the chassis assembly which are ordinarily punched for equipment mounting are constructed with at least one unflanged edge to facilitate the punching operation and the flanges provided are relatively narrow and arranged so that holes may be punched as near the edge as may be desired.

The equipment assembler will then be able to quickly assemble the chassis and further to assemble several of such chassis assemblies in a complete electronic housing unit. The housing unit may be adjusted in height as desired for a particular type of equipment.

Figure 11:
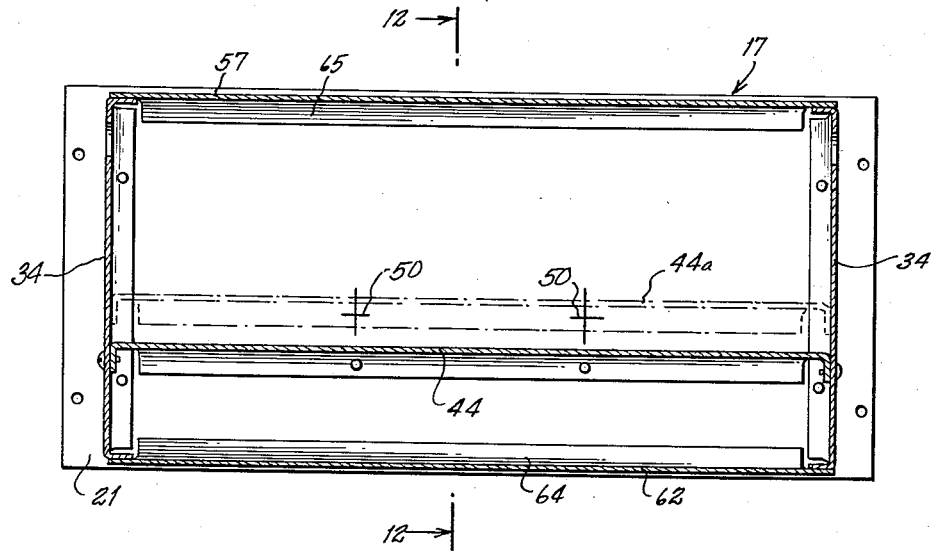
FIG. 11 is a sectional front elevational view of the chassis assembly of FIG. 10 taken along the line 11—11 in FIG. 10.

The basic components of the chassis assemblies and the maner in which these components may be assembled are illustrated in FIGS. 10, 11, 12 and 13. In FIG. 11 the medium size chassis assembly 17 is illustrated. It will be noted that the base plate 44 forming a part of the chassis assembly 17 may also be used in the chassis assemblies of different size shown at 16 and 18 in FIG. 1. The same is true of the bottom cover 62. It will also be seen by reference to FIG. 12 that the base bracket 45 at the rear of the chassis assembly 17 may also be used in chassis assemblies of different sizes.

Figure 12:
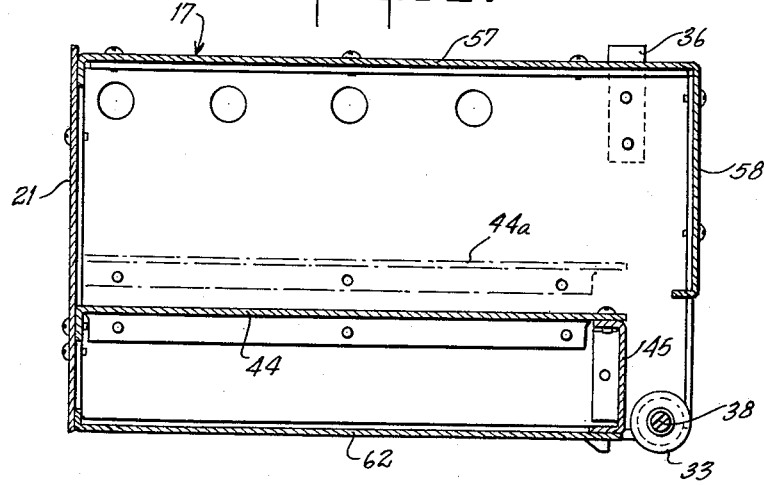
FIG. 12 is a sectional side elevational view of the chassis assembly taken along the line 12—12 in FIG. 11.

It may in some cases be desired to vary the height of the base plate 44 in the chassis assembly 17 depending on the size of the various components to be mounted on the top and below the base plate 44. In FIG. 11 and 12 it will be noted that the base plate 44 may be moved to the position 44a thus providing different relative amounts of space above and below the base plate 44. Small variations in the height of the base plate 44 may also be achieved by turning the plate over to place the flanges up. The base plate 44 may thus be lowered by a distance approximately equal to the width of the flange. A different size bracket 45 may be used in the event that the base plate 44 is raised, or alternatively the smaller plate 45 may simply be raised with the base plate 44.

To facilitate the assembly of the chassis assemblies and at the same time to preserve the appearance of the housing it is desired that holes not be provided for all of the alternative locations of the base plate and other adjustable portions of the housing unit. Instead the location of alternative holes may be center punched on the inside surface of the various components of the electronic equipment housing. The holes may then be readily drilled or punched by the assembler since the greatest amount of time in drilling such holes is expended in the proper location and center punching of the hole. Alternative screw hole positions are shown for example by the crosses 50 in FIG. 11.

As shown in FIGS. 11 and 12 the various sides of the chassis assembly may be provided with flanges wherever possible to facilitate construction of the chassis assemblies and also to strengthen the chassis assembly structure.

It should further be noted, however, that there are no flanges on the front panels 19, 21 and 22 and thus the front panels may readily be inserted into a punch press to punch holes for meters, switches and the like. The base plate 44 which will be required to have holes punched therein is also provided with one unflanged edge so that it may be readily inserted into a punching machine for the punching of holes for tubes, coils or other equipment as desired.

The chassis assemblies 16, 17 and 18 will normally be secured in place in the housing 11 by screwing the front panels 19, 21 and 22 to the front columns 15a and 15b of the housing 11 and also by screwing the rear of the side panels 27, 34 and 41 to a flange 60 of the rear housing columns 14a and 14b. The fastening of the chassis assemblies in the housing is best shown in FIGS. 1, 4 and 6.

From the foregoing description it will be obvious that a housing arrangement for electrical equipment is provided which is of greatly improved utility and simplicity. Many modifications may be made to the particular illustrated embodiments of the invention without exceeding the scope of the invention. The scope of the invention is therefore not to be construed to be limited by the particular embodiments shown by way of illustration but is rather to be limited solely by the appended claims.

What is claimed is:

1. A housing for electrical equipment comprising at least two chassis assemblies, each including a base plate, a front panel, two side panels attached to said base plate, means for attaching said front panel to said side panels, and a roller rotatably mounted on each of said side panels; an open sided frame; means for removably fastening at least one chassis assembly in a fixed position in said frame and an adjustable door formed of two telescoping sections pivotally mounted on said frame for closing the rear of said frame said door being adjustable to a height corresponding to the combined height of a predetermined number of said chassis and also to a lesser number thereof.

2. A housing for electrical equipment comprising at least one chassis assembly including a rectangular base plate having flanges on not more than three sides, a flat unflanged rectangular front panel, two side panels attached to respective sides of said base plate, said side panels being flanged at least on the top and front edge and extending beyond the rear of said base plate, means for attaching said front panel to the front flanges of said side panels, a member supporting the rear edge of said base plate and attached at each end to one of said side panels, a flanged roller rotatably mounted on the inside of the rear lower corner portion of each of said side panels and extending below said panels, a lug protruding upwardly from the top rear portion of each said side panel and a second lug protruding downwardly from the bottom rear portion of each said side panel said second lug having a sloped forward edge, the rear edge of said second lug being in substantially vertical alignment with the front edge of said first lug; an open sided frame having an internal horizontal cross section of slightly greater dimensions than the external horizontal cross section of said chassis assembly; and means for removably fastening at least one chassis assembly in a fixed position in said frame.

3. A chassis assembly for electrical equipment comprising a base plate, a front panel, two side panels attached to said base plate, means for attaching said front panel to said side panels, a member supporting the rear edge of said base plate and attached at each end to one of said side panels, a roller rotatably mounted on the inside of each of said side panels and extending below said panels, a lug protruding upwardly from the top rear portion of each said side panel and a second lug protruding downwardly from the bottom rear portion of each said side panel, the rear edge of said second lug being in substantially vertical alignment with the front edge of said first lug.

4. A chassis assembly for electrical equipment comprising a rectangular base plate having flanges on not more than three sides, a flat unflanged front panel, two side panels attached to respective sides of said base plate, said side panels being flanged at least on the top and front edge and extending beyond the rear of said base plate, means for attaching said front panel to the front flanges of said side panels, a member supporting the rear edge of said base plate and attached at each end to one of said side panels, a flanged roller rotatably mounted on the inside of the rear lower corner portion of each of said side panels and extending below said panels, a lug protruding upwardly from the top rear portion of each said side panel and a second lug protruding downwardly from the bottom rear portion of each said side panel said second lug having a sloped forward edge, the rear edge of said second lug being in substantially vertical alignment with the front edge of said first lug.

References Cited in the file of this patent

UNITED STATES PATENTS

| 893,648 | Peters | July 21, 1908 |
| 1,171,185 | Fox | Feb. 8, 1916 |
| 1,202,706 | Grehan | Oct. 24, 1916 |
| 1,292,946 | Yawman | Jan. 28, 1919 |
| 1,492,946 | Ogden | Apr. 29, 1924 |
| 1,588,771 | Richardson | June 15, 1926 |
| 2,309,323 | Lear | Jan. 26, 1943 |
| 2,411,528 | Dodington | Nov. 26, 1946 |
| 2,602,842 | Morris et al. | July 8, 1952 |
| 2,658,101 | Coxe | Nov. 3, 1953 |
| 2,711,944 | Meek | June 28, 1955 |
| 2,752,219 | Yonkers | June 26, 1956 |
| 2,823,973 | Carver | Feb. 18, 1958 |

FOREIGN PATENTS

| 295,200 | Italy | Apr. 15, 1932 |
| 1,126,496 | France | July 30, 1956 |